United States Patent [19]

Koksbang

[11] Patent Number: 5,824,285
[45] Date of Patent: Oct. 20, 1998

[54] METHOD OF MAKING LITHIUM MANGANESE OXIDE COMPOUNDS

[75] Inventor: Rene Koksbang, Odense, Denmark

[73] Assignee: Valence Technology, Inc., Henderson, Nev.

[21] Appl. No.: 735,771

[22] Filed: Oct. 23, 1996

[51] Int. Cl.$^6$ .................................................. C01G 45/12
[52] U.S. Cl. ........................................ 423/599; 429/224
[58] Field of Search ......................... 423/599, 49, 179.5; 429/224

[56] References Cited

U.S. PATENT DOCUMENTS

| | | | |
|---|---|---|---|
| 4,246,253 | 1/1981 | Hunter | 423/605 |
| 4,828,834 | 5/1989 | Nagaura et al. | 429/194 |
| 5,135,732 | 8/1992 | Barboux et al. | 423/593 |
| 5,147,739 | 9/1992 | Beard | 429/194 |
| 5,196,279 | 3/1993 | Tarascon | 429/194 |
| 5,326,545 | 7/1994 | Koksbang et al. | 423/593 |
| 5,334,334 | 8/1994 | Koksbang | 423/593 |
| 5,418,090 | 5/1995 | Koksbang et al. | 429/224 |
| 5,425,932 | 6/1995 | Tarascon | 423/599 |
| 5,449,577 | 9/1995 | Dahn et al. | 423/594 |
| 5,512,214 | 4/1996 | Koksbang | 429/218 |
| 5,520,903 | 5/1996 | Chang et al. | 423/593 |
| 5,567,401 | 10/1996 | Doddapaneni et al. | 423/598 |

OTHER PUBLICATIONS

J.M. Tarascon, E. Wang, F.K. Shokoohi, W.R. McKinnon, and S. Colson, "The Spinel Phase of LiMn$_2$O$_4$ as a Cathode in Secondary Lithium Cells", J. Electrochem. Soc., vol. 138, No. 10, 2859–2864, Oct., 1991.

J.M. Tarascon and D. Guyomard, "Li Metal–Free Rechargeable Batteries Based on Li$_{1+x}$Mn$_2$O$_4$ Cathodes (0≦x≦1) and Carbon Anodes", J. Electrochem. Soc., vol. 138, No. 10, 2864–2868, Oct., 1991.

J. Farcy, J.P. Pereira–Ramos, L. Hernan, J. Morales, and J.L. Tirado, "Cation–Deficient Mn–Co Spinel Oxides as Electrode Material for Rechargeable Lithium Batteries", Electrochimica Acta, vol. 39, No. 3, 339–345, 1994, No month.

R.J. Gummow, A. deKock, M.M. Thackeray, "Improved Capacity Retention in Rechareable 4 V Lithium/Lithium–Manganese Oxide (Spinel) Cells", Solic State Ionics, vol. 69, 1994, No month.

H. Huang and P.G. Bruce, "A 3 Volt Lithium Manganese Oxide Cathode for Rechargeable Lithium Batteries", J. Electrochem. Soc., vol. 141, No. 7, Jul. 1994.

*Primary Examiner*—Steven Bos
*Attorney, Agent, or Firm*—Linda Deschere

[57] ABSTRACT

In a preferred method, a lithium compound is reacted with a manganese compound in the presence of gaseous ammonia produced by the decomposition of an ammonium compound. In the preferred method, the decomposition of the ammonium compound is initiated before the reaction occurs to form the lithium manganese oxide product spinel. It is also possible to have the decomposition initiated at about the same time as the reaction. It is possible to have the decomposition continue while the reaction to form the spinel occurs. The reaction to form the spinel occurs at an elevated temperature to provide a product of the desired nominal general formula, having a quantity of lithium corresponding to more than 1 atomic units of lithium for every 2 atomic units of manganese. This lithium-rich product, having greater than a 1:1 ratio of Mn$^{+3}$ to Mn$^{+4}$ is made possible by the presence of the ammonia decomposition gas. It is preferred that the lithium compound, the manganese compound, and the ammonium compound each be in particle form and intermingled in a desired proportion prior to heating.

2 Claims, 1 Drawing Sheet

METHOD OF MAKING LITHIUM MANGANESE OXIDE COMPOUNDS

FIELD OF THE INVENTION

This invention relates to electrochemical cells and batteries, and more particularly, to improved electrodes for such batteries.

BACKGROUND OF THE INVENTION

Lithium batteries are prepared from one or more lithium electrochemical cells. Such cells typically include an anode (negative electrode) of metallic lithium, a cathode (positive electrode) typically a transition metal chalcogenide and an electrolyte interposed between spaced apart positive and negative electrodes. The electrolyte typically comprises a salt of lithium dissolved in one or more solvents, typically nonaqueous (aprotic) organic solvents. By convention, during discharge of the cell, the negative electrode of the cell is defined as the anode. During use of the cell, lithium ions (Li+) are transferred to the negative electrode on charging. During discharge, lithium ions (Li+) are transferred from the negative electrode (anode) to the positive electrode (cathode). Upon subsequent charge and discharge, the lithium ions (Li+) are transported between the electrodes. Cells having metallic lithium anode and metal chalcogenide cathode are charged in an initial condition. During discharge, lithium ions from the metallic anode pass through the liquid electrolyte to the electrochemically active material of the cathode whereupon electrical energy is released. During charging, the flow of lithium ions is reversed and they are transferred from the positive electrode active material through the electrolyte and then back to the lithium negative electrode.

It has recently been suggested to replace the lithium metal anode with a carbon anode, such as coke or graphite, which are intercalation compounds. Such negative electrodes are used with lithium containing cathodes, in order to form an $Li_xC$ anode. Such cells, in an initial condition, are not charged. In order to be used to deliver electrochemical energy, such cells must be charged in order to transfer lithium to the carbon from the lithium containing cathode. During discharge, the lithium is transferred from the anode back to the cathode. During subsequent recharge, the lithium is transferred back to the anode where it reintercalates into the carbon. Lithium manganese oxide represented by the general nominal formula $Li_xMn_2O_4$ is known to be an intercalation compound usable as a cathode material in a lithium battery. This material has been used as a positive electrode for batteries comprising lithium metal anodes as well as a positive cathode lithium source for lithium ion batteries, for example, comprising intercalation carbon electrodes as anodes.

Methods of synthesis for $Li_1Mn_2O_4$ compounds are known and are reactions generally between stoichiometric quantities of a lithium containing compound and a manganese containing compound, exemplified by a lithium salt and manganese oxide. Common precursors are, for example, lithium salt and $MnO_2$ compounds as disclosed by Hunter in U.S. Pat. No. 4,246,253. However, such compounds prepared by conventional methods have a disadvantage in that the charge capacity of a cell comprising a cathode of such compounds suffers a progressive loss in capacity as the number of cycles of such cell increases. That is, although the initial capacity may be an acceptable value, such initial capacity value is diminished upon the first cycle of operation and such capacity further diminishes on every successive cycle of operation. Such capacity fading is well known.

In U.S. Pat. No. 4,828,834 Nagaura et al attempted to reduce capacity fading by sintering precursor lithium salt and $MnO_2$ materials and thereby forming an $LiMn_2O_4$ intercalation compound. However, Nagaura's $LiMn_2O_4$ compounds were not fully crystallized spinel electrodes and suffered from a very low capacity. Similar to Nagaura, Tarascon, U.S. Pat. No. 5,196,279, shows a process for producing lithium manganese oxide which requires using an evacuated, sealed ampoule which is heated under strictly controlled conditions for about 24 hours. Then cooling occurs over strictly controlled conditions while the ampoule remains sealed. This requires the use of an airtight enclosure which is evacuated, and 24 hours of reaction time, at very controlled temperatures. The complexity of this process and the control required are self-evident.

Despite the above approaches, there remains the difficulty of obtaining lithium manganese oxide based electrode materials having the attractive capacity of the basic spinel $Li_1Mn_2O_4$ intercalation compound, but without its disadvantage of significant capacity loss on progressive cycling. Therefore, what is needed is a new process for preparing electrode active material which is economical, which does not require evacuated reaction vessels and precise production conditions, and which is adaptable to commercial production processes and which achieves good conversion of the starting materials to the final desired product.

SUMMARY OF THE INVENTION

In a preferred method, a compound of the nominal general formula $Li_xMn_2O_4$ is prepared chemically in a chemical reaction to provide an as prepared condition, a quantity of lithium (x) which is at least equal to 1 and preferably greater than 1. In an as prepared condition, the quantity of lithium is desirably greater than 1.1, more desirably greater than 1.25, and preferably 1.5 or greater and up to 2. The method of the invention provides, for the first time, an economical means for obtaining lithium manganese oxide spinel of the formula $Li_{1.1}Mn_2O_4$, $Li_{1.25}Mn_2O_4$, and up to about $Li_2Mn_2O_4$, containing excess lithium, far in excess of the conventional $Li_1Mn_2O_4$ prepared by presently known means. The term "excess lithium" as used above indicates that there is additional lithium beyond the 1 unit of lithium contained in conventional $Li_1Mn_2O_4$. Therefore, in the case of $Li_{1.1}Mn_2O_4$, the amount of excess lithium is about 10 percent or 0.1 atomic units. Correspondingly, 0.25 atomic units of excess lithium is provided in $Li_{1.25}Mn_2O_4$ and 1 unit of excess lithium is provided in $Li_2Mn_2O_4$. The presence of this excess lithium means that capacity loss generally observed on cycling in conventional batteries containing, for example, carbon anodes and lithium manganese oxide cathodes, is offset by the ability to satisfy such capacity loss with the excess lithium. In other words, on cycling of the battery, the excess lithium may be irreversibly contained within the negative electrode but yet on cycling, a full unit of lithium may be cycled back between the cathode and the anode. More specifically, in the case of $Li_{1.25}Mn_2O_4$, 0.25 atomic units of lithium may be irreversibly intercalated in the anode and yet a full atomic unit, $Li_{1.0}$, is still available for deintercalation and reintercalation at the cathode; and for intercalation and deintercalation at a conventional graphite anode. Those skilled in the art will understand that it is desired that the lithium compound and the manganese compound precursors be present in an amount which provides the nominal general formula having x at least equal to 1 and preferably greater than 1. The method of the invention is usable to avoid the cumbersome use of protective atmosphere gases when attempting to achieve the nominal general formulas of x beyond the conventional range which ranges as low as about 0.75 atomic units of lithium, to reach up to 2 atomic units of manganese.

The method comprises reacting a lithium compound with a manganese compound, in the presence of gaseous ammonia produced by the decomposition of an ammonium compound. In the preferred method, the decomposition of the ammonium compound is initiated before the reaction occurs to form the product $Li_xMn_2O_4$. It is also possible to have the decomposition initiated at the same time as the reaction. It is possible to have the decomposition continue while the reaction occurs. The reaction to form $Li_xMn_2O_4$ occurs at an elevated temperature to provide a product of the desired nominal general formula having a desired quantity of x, in the presence of the ammonia gas.

It is preferred that the manganese compound and the lithium compound be in powder, or particle form, and that the lithium compound particles be intermingled with the manganese compound particles in a desired proportion which provides the nominal general formula. Preferably, an excess of lithium is used. In a preferred embodiment, the ammonium compound is also in particle, granule, or crystal form and is intermingled with the particles of lithium and manganese precursors. The decomposition is initiated by heating the precursor materials in an oven. The decomposition of the ammonium compound will typically occur before a temperature is reached sufficient to cause reaction to form the $Li_xMn_2O_4$. It is preferred that the ammonium compound be in the form of granules which decompose to form the gaseous products. It is particularly preferred that the ammonium compound be decomposable to form only gaseous products.

Advantageously, the decomposition and the reaction may occur in a reaction chamber which is not required to be evacuated. And it is not necessary to provide a protective atmosphere from external of the chamber in the form of transported gases, such as argon or nitrogen. The method conveniently provides the required non-oxidizing atmosphere, in air in a conventional oven, by the presence of one of the precursors within the reaction vessel. That is, the solid ammonium compound itself decomposes to provide the non-oxidizing environment. Accordingly, the overall reaction may be conducted in air where a sufficient quantity of the ammonium compound is included to at least partially offset the oxidizing environment of the ambient air.

It is an object of the invention to provide a new method for preparing a lithium manganese oxide electrode active material for a lithium battery which contains, in an as prepared condition, an excess amount of lithium as compared to conventional lithium manganese oxide spinel. Another object is to provide a lithium battery having good charge and discharge capacity. Another object is to provide an improved electrochemical battery based on lithium which may maintain good capacity over a prolonged life cycle as compared to presently used batteries containing the conventionally made spinel. Another object is to provide lithium manganese oxide active material having a relatively low amount of precursor contaminants whereby the composition approaches 100 percent by weight $Li_xMn_2O_4$. Another object is to provide good conversion of the starting materials to the $Li_xMn_2O_4$ product.

These and other objects, features, and advantages will become apparent from the following description of the preferred embodiments, claims, and accompanying drawings.

DETAILED DESCRIPTION OF THE PREFERRED EMBODIMENTS

Figure 1:
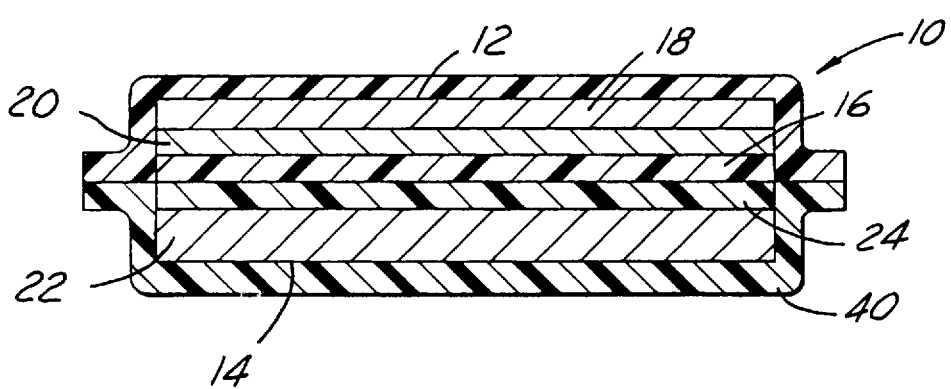
FIG. 1 is an illustration of a cross section of a thin battery or cell embodying the invention.

In a preferred method, a compound of the nominal general formula $Li_xMn_2O_4$ is prepared chemically in a chemical reaction to provide an as prepared condition, a quantity of lithium (x) which is at least equal to 1 and preferably greater than 1. In an as prepared condition, the quantity of lithium is desirably greater than 1.1, more desirably greater than 1.25, and preferably 1.5 or greater and up to 2. The method of the invention provides, for the first time, an economical means for obtaining lithium manganese oxide spinel of the formula $Li_{1.1}Mn_2O_4$, $Li_{1.25}Mn_2O_4$, and up to about $Li_2Mn_2O_4$, containing excess lithium, far in excess of the conventional $Li_1Mn_2O_4$ prepared by presently known means.

The invention provides a substantial advantage over conventional methods of forming lithium manganese oxide. In conventionally formed lithium manganese oxide of the formula $Li_1Mn_2O_4$ the charge distribution is $Li^{+1}Mn^{+4}Mn^{+3}O_4^{-2}$ (+1, +4, +3, -8). In this conventional case, when 0.5 formula units of lithium is deintercalated (extracalated) $Mn^{+3}$ is oxidized to $Mn^{+4}$ and the following charge distribution results as follows $Li^{+1}Mn^{+4}Mn^{+3}O_4^{-2} \rightarrow Li_{0.5}^{+1}Mn_{1.5}^{+4}Mn_{0.5}^{+3}O_4^{-2}+0.5\ Li^+$. In this deintercalation process, the 0.5 remaining units of lithium provides a positive charge equivalent of +0.5, the amount of Mn carrying the +4 charge increases from 1 to 1.5, and the amount of Mn carrying the +3 charge decreases from 1 to 0.5 equivalent units. Thus, the charge distribution becomes +0.5, +6, +1.5, -8. In contrast, in accordance with the method of the invention, it is possible to have a higher $Mn^{+3}$ content in the initial active material, but this is only possible by providing the ammonia containing atmosphere described herein. This provides the ability to include an excess amount of lithium in the starting material corresponding to the increased amount of $Mn^{+3}$. In an optimized case, assuming the starting material is chemically prepared with 2 atomic units of lithium, the following charge distribution would result $Li_2^{+1}Mn^{+3}Mn^{+3}O_4^{-2}$ (+2, +3, +3, -8). The deintercalation of one $Li^+$ unit is as follows $Li_2^{+1}Mn^{+3}Mn^{+3}O_4^{-2} \rightarrow Li^{+1}Mn^{+3}Mn^{+4}O_4^{-2}+1.0\ Li^+$. In this deintercalation product, the charge distribution is +1, +3, +4, -8. Therefore, by providing an excess amount of lithium, under non-oxidizing and preferably reducing conditions, the maximum lithium content is increased, and this is accomplished by the method of the invention using an ammonia precursor. Therefore, the invention provides a mechanism for changing the relative amounts of $Mn^{+3}$ and $Mn^{+4}$, which are typically in a 1:1 ratio and in a conventional stoichiometric compound. By the method of the invention the amount of $Mn^{+3}$ and the lithium content are both increased under the influence of a non-oxidizing and preferably reducing atmosphere. The term "excess lithium" as used above indicates that there is additional lithium beyond the 1 unit of lithium contained in conventional $Li_1Mn_2O_4$. The presence of this excess lithium means that capacity loss generally observed on cycling in conventional batteries containing, for example, carbon anodes and lithium manganese oxide cathodes, is offset by the ability to satisfy such capacity loss with the excess lithium. In other words, on cycling of the battery, the excess lithium may be irreversibly contained within the negative electrode but yet on cycling, a full unit of lithium may be cycled back between the cathode and the anode. More specifically, in the case of $Li_{1.25}Mn_2O_4$, 0.25 atomic units of lithium may be irreversibly intercalated in the anode and yet a full atomic unit, $Li_{1.0}$, is still available for deintercalation and reintercalation at the cathode; and for intercalation and deintercalation at a conventional graphite anode. Those skilled in the art will understand that it is desired that the lithium compound and the manganese compound precursors be present in an amount which provides the nominal general formula having x at least equal to 1 and preferably greater than 1. The method of the invention is usable to avoid the cumbersome use of protective atmosphere gases when attempting to achieve the nominal general formulas of x beyond the conventional range which ranges as low as about 0.75 atomic units of lithium, to reach up to 2 atomic units of manganese.

The method comprises reacting a lithium compound with a manganese compound, in the presence of gaseous ammonia produced by the decomposition of an ammonium compound. In the preferred method, the decomposition of the ammonium compound is initiated before the reaction occurs to form the product $Li_xMn_2O_4$. It is also possible to have the decomposition initiated at the same time as the reaction. It is possible to have the decomposition continue while the reaction occurs. The reaction to form $Li_xMn_2O_4$ occurs at an elevated temperature to provide a product of the desired nominal general formula having a desired quantity of x, in the presence of the ammonia gas.

It is preferred that the manganese compound and the lithium compound be in powder, or particle form, and that the lithium compound particles be intermingled with the manganese compound particles in a desired proportion which provides the nominal general formula. Preferably, an excess of lithium is used. In a preferred embodiment, the ammonium compound is also in particle, granule, or crystal form and is intermingled with the particles of lithium and manganese precursors. The decomposition is initiated by heating the precursor materials in an oven. The decomposition of the ammonium compound will typically occur before a temperature is reached sufficient to cause reaction to form the $Li_xMn_2O_4$. It is preferred that the ammonium compound be in the form of granules which decompose to form the gaseous products. It is particularly preferred that the ammonium compound be decomposable to form only gaseous products. For example, suitable ammonium precursors include ammonium carbonate and ammonium acetates. In the case of ammonium carbonate, $(NH_4)_2CO_3$, the decomposition gases consist of ammonia $(NH_3)$ and typically carbon dioxide $(CO_2)$ and water vapor $(H_2O)$. In the case of ammonium acetate, $NH_4CH_3COO$, the decomposition products comprise ammonia, $CH_3COOH$, $CH_4$, $CO_2$, $H_2CO$, and $H_2O$. Ammonium carbonate, ammonium bicarbonate, and ammonium carbamate, are all related and all provide some proportion of the aforesaid decomposition products, ammonia $(NH_3)$, carbon dioxide $(CO_2)$, and water vapor $(H_2O)$. In general, the characteristics of the ammonium compound include the ability to decompose to create a reducing atmosphere and the ability to decompose to form gaseous products. The gaseous decomposition products contain an ammonia component and a non-ammonia component that does not offset the reducing effect (capacity) of the ammonia component. In other words, the gaseous decomposition products taken together provide a non-oxidizing atmosphere. It is preferred that the ammonia and the non-ammonia decomposition components together provide a reducing atmosphere.

It is preferred that the ammonium compound decompose to release ammonia and one or more other gaseous constituents before the ammonium compound melts, when such ammonium compound is included with the lithium and manganese precursors as an intermingled powder mixture. This is contrary to, for example, ammonium sulfamate which is less desirable because it has a melting point of approximately 131° C. and a decomposition temperature of 160° C. In contrast, ammonium compounds, such as acetates and carbonates, decompose at a relatively low temperature on the order of 60° C. It is preferred that the lithium compound be selected from the group consisting of lithium hydroxide (LiOH), lithium nitrate ($LiNO_3$), lithium carbonate ($Li_2CO_3$), lithium acetate ($LiCH_3COO$), and lithium oxide ($Li_2O$). It is preferred that the manganese compound be selected from the group consisting of manganese hydroxide ($Mn(OH)_2$), manganese nitrate ($Mn(NO_3)_2$), manganese carbonate ($Mn_2(CO_3)_3$), manganese acetate ($Mn(CH_3COO)_2$), and manganese oxide ($MnO_2$). It is preferred that the lithium, manganese, and ammonium compounds each be independently selected from the group consisting of carbonates and acetates.

The reaction between the lithium compound and the manganese compound occurs in air, at a temperature greater than the decomposition temperature of the ammonium compound, and at a temperature which is less than the decomposition temperature of a lithium manganese oxide product. The temperature is desirably at least 500° C., less than or equal to 800° C., and suitably is in a range of about 650° C. up to about 750° C. These temperatures are well below the melting and decomposition temperatures of the $Li_xMn_2O_4$ final product, which melts at approximately 1200° C.

Advantageously, the decomposition and the reaction may occur in a reaction chamber which is not required to be evacuated. And it is not necessary to provide a protective atmosphere from external of the chamber in the form of transported gases, such as argon or nitrogen. The method conveniently provides the required non-oxidizing atmosphere, in air in a conventional oven, by the presence of one of the precursors within the reaction vessel. That is, the solid ammonium compound which itself decomposes to provide the non-oxidizing environment. Accordingly, the overall reaction may be conducted in air where a sufficient quantity of the ammonium compound is included to at least partially offset the oxidizing environment of the ambient air.

It is preferred that the ammonium compound upon decomposition provide not only an atmosphere of decomposition gases which are non-oxidizing, but preferably provides upon decomposition gaseous constituents which together provide a reducing atmosphere. One group of ammonium compounds that is thought to be suitable are those which form a basic, neutral, or slightly acidic solution in water. Those skilled in the art will understand that a neutral solution has a pH of approximately 7 and acidic solution has a pH less than 7 with the pH approaching 0 being the most acidic. The most basic compounds have a pH approaching 14 and are also referred to as alkaline. In the present invention it is preferred that the ammonium compound form basic neutral or slightly acidic solutions in water, that is, a pH greater than about 5 and preferably greater than about 5.5. Examples include ammonium acetate which is an ammonium salt of the formula $CH_3COONH_4$, generally provided as a commercial product containing 95 percent to 97 percent ammonium acetate salt, with some impurity in the form of acidic acid and water. Ammonium acetate is generally prepared from acidic acid and $NH_3$. Ammonium acetate tends to lose $NH_3$ by decomposition at a temperature considerably lower than its melting point of 114° C. It is known that a very concentrated acid solution of ammonium acetate is only very slightly acidic with 0.5 molar aqueous solution having a pH close to 7.

Other desirable ammonium precursors are selected from among the carbonates. The preferred ammonium compound is ammonium carbonate, Merck Index No. 519, of the formula $(NH_4)_2CO_3 \cdot H_2O$, also known as Hartshorn salt or ammonium carbonate carbamate, $(NH_4)HCO_3 \cdot (NH_4)(NH_2)(CO_2)$. Ammonium carbonate is generally considered to be a mixture of ammonium bicarbonate, Merck Index No. 507, of the formula $NH_4HCO_3$, and ammonium carbamate, Merck Index No. 518, of the formula $NH_2COONH_4$. Note that ammonium carbamate (518) is a crystalline powder that gradually loses ammonia in air changing to ammonium carbonate. It volatilizes at about 60° C. Note that ammonium carbonate contains about 30 to 34 percent $NH_3$, about 45 percent $CO_2$. It is a colorless crystal mass in the form of white powder as characterized by strong alkaline reactions. It decomposes on exposure to air with loss of $NH_3$ and $CO_2$, becoming white and powdery and converting to ammonium bicarbonate. It volatilizes at about 60° C. Therefore, ammonium bicarbonate characterized as $NH_4HCO_3$, decomposes to $NH_3$, $CO_2$, and $H_2O$. The percentages of the gaseous decomposition products are about 21.5 percent $NH_3$, about 55.7 percent $CO_2$, and about 22.8 percent water vapor, on a weight percent basis. As stated earlier, ammonium carbonate is relatively unstable in air and is converted into the bicarbonate. Further characteristics of the carbonates are as follows. Ammonium carbamate (518) is a crystalline powder or granules that gradually loses ammonia in the air changing to ammonium carbonate. It volatilizes at about 60° C. and is soluble in water and alcohol. Ammonium carbonate (519) also referred to as Hartshorn is a mixture of ammonium bicarbonate and ammonium carbamate obtained by subliming a mixture of ammonium sulfate and calcium carbonate. It is colorless, hard, and translucent crystal mass like cubes or powder. It is characterized by alkaline reactions. The carbonate decomposes on exposure to air with loss of $NH_3$ and $CO_2$ becoming white and powdery and converting into the ammonium bicarbonate. It volatilizes at about 60° C. It is slowly soluble in 4 parts water and the carbamate portion dissolves in alcohol. Ammonium bicarbonate (507) is usually prepared by passing an excess carbon dioxide through concentrated ammonia water. It is shiny, hard, colorless or white prisms or crystalline mass. It is comparatively stable at room temperature, but volatile with decomposition at about 60° C. The white fumes given off consist of ammonium, carbon dioxide, and water in the proportion stated above. The pH of 0.1 normal solution in water at about 25° C. is approximately 7.8 and it is insoluble in alcohol and acetone.

While the decomposition product $NH_3$ is reducing, it is accompanied by other decomposition products, such as, carbon dioxide (slightly oxidizing), methane (reducing), and water (both). However, ammonia ($NH_3$) is very powerfully reducing, yielding an overall reducing atmosphere by the aforementioned decomposition. Ammonia ($NH_3$) is characterized itself by decomposition in an endothermic reaction at about 1870° C. to 1000° C. At the lower end a catalytic initiator may be required. It is thought that the temperatures of the presently described process are insufficient to cause ammonia ($NH_3$) to decompose to nitrogen and hydrogen. Once the ammonium compound is decomposed to provide gaseous ammonia ($NH_3$) it is possible to establish equilibrium with carbon dioxide, water, and oxygen to prevent or at least diminish oxidative reactions with the lithium containing compound and the manganese containing compound precursors. The relative proportions of carbon dioxide, carbon monoxide, hydrogen, water vapor, oxygen, and ammonia will determine the overall condition of the atmosphere. Clearly, the presence of the ammonium compound will cause the atmosphere in the reaction chamber to be less oxidizing than would have been the case absent the ammonium compound.

It is preferred that the ammonium compound be selected so that it decomposes before it has a chance to melt. This is contrary to, for example, ammonium sulfamate ($NH_4SO_3NH_2$), Merck Index No. 574, which has a melting point of 131° C. and a decomposition temperature of 160° C. Since ammonium sulfamate would melt before it decomposes it is not preferred when the ammonium compound is to be intermingled with the lithium compound and the manganese compound. The ammonium sulfamate would be suitable if maintained separate from the precursors of the lithium manganese oxide product. It is preferred from a safety point of view that the decomposition products not ignite spontaneously or have a very large range of combustion limits in air. This is in contrast to ammonium hypophosphite, Merck Index No. 544, of the formula $NH_4H_2PO_2$ which when decomposed evolves phosphine which ignites spontaneously. For similar reasons, ammonium perchlorate, Merck Index No. 559, of the formula $NH_4ClO_4$ would also not be desirable since it is readily explosive.

It is apparent from the description above that the combustion limits of the ammonium compound and of the decomposition products be such that they are suitable for use in an air atmosphere in the oven at the reaction temperature required to cause formation of the spinel product from the lithium precursor and the manganese precursor. In addition to ammonium acetate and the ammonium carbonates described above, those skilled in the art will appreciate that many other ammonium compounds, such as ammonium salts, are usable in the method of the invention, particularly salts formed on direct union of ammonia or neutralization of ammonium hydroxide with acids. These are generally white salts soluble in water. They are decomposed by heat into ammonia and the corresponding non-ammonia constituent, frequently an acid, which itself may also be decomposed often to form carbon dioxide and water vapor. Among the desirable ammonium compounds are acetates and carbonates. Many other ammonium compounds, besides acetates and carbonates may be used, such as, amines, amides, ammonium chloride, ammonium citrate, ammonium tartrate, sulfates, and nitrates. Since many generally commercially available ammonium salts liberate ammonia ($NH_3$) when heated, a large selection is available in accordance with the guidelines and criteria described and taught in this present disclosure.

The lithiating agents are lithium containing compounds also preferably in solid form, such as lithium salts: LiOH, $LiNO_3$, and $Li_2CO_3$. These lithium containing compounds are widely known and available from a number of chemical supply houses including Fluka and Aldrich Chemical Co. Powder of lithium carbonate of a 99.997 percent purity is available from Aldrich Chemical Co., Inc. of Milwaukee, Wis. The material is in particle form, has a melting point of approximately 618° C., a specific gravity of approximately 2.1 grams per cc, a particle size of less than 200 mesh (about 70 microns) and has the appearance of a white powder. The chemical abstract (CAS) number for lithium carbonate is 554-13-2 and its synonyms are camcolit, carbonic acid dilithium salt, candamide, carbonic acid lithium salt and dilithium carbonate. Lithium hydroxide is a powder of essentially colorless crystals having a specific gravity of approximately 2.54 and a melting point of approximately 462° C. Other desirable lithium compounds are lithium acetate ($LiCH_3COO$) and a lithium oxide ($Li_2O$). It is desired that the manganese compound be selected from the group consisting of manganese acetate of the representative formula $Mn(CH_3COO)_2$, manganese hydroxide $(Mn(OH)_2)$, manganese nitrate $(Mn(NO_3)_2)$ and manganese carbonate $((Mn_2(CO_3)_3)$ and manganese oxide $(MnO_2)$.

The aforesaid precursor compounds are generally crystals, granules, and powders, and are generally referred to as being in particle form. The acetate and nitrate precursors are known to be hygroscopic. Therefore, when measuring out precursor quantities, adjustments may be required to account for retained water in the precursor compounds. As can be seen, the precursor compounds are characterized by a light white or translucent appearance when heated to a temperature sufficient to cause a reaction, they appear to glow red, typically in a range of about 500° C. to about 700° C. or more, and preferably in a range of about 600° C. to about 700° C. The progress of the reaction to form the lithium manganese oxide spinel may be followed by a color change. The temperature of heating is sufficient to cause manganese, lithium, and oxygen to combine to form the $Li_xMn_2O_4$, x>1. Depending on the precursors, the reaction may take place in a solid state (solid phase) between the Li precursor and the Mn precursor. The elevated temperature causes diffusion of one or more elements, such as Li, across particle boundaries. Solid phase reaction occurs between precursors, such as, $MnO_2$ and $Li_2CO_3$. After sufficient heating, the reaction product appears relatively darker or more gray in color than the precursors. After reaction the rate of cooling is not considered to be critical. The precursors of the invention are generally referred to as being powders, granules, or particles. It is preferred that the particle size be reduced from its typical commercial value of about 40 microns median particle diameter to on the order of about 10 microns or less. This facilitates contact between the lithium precursor and the manganese precursor. The reaction may also occur between the Li precursor and the Mn precursor in the molten state (liquid phase), at the reaction temperature in the presence of ammonia gas.

The proportion of precursors should be such that they provide approximately the atomic ratios of lithium and manganese as required in the final product which is at least, and preferably greater than 1:2 of Li:Mn. This corresponds to one or more mole equivalent of lithium carbonate $(LiCH_3COO)$ for each 2 moles equivalent of the manganese carbonate $(Mn(CH_3COO)_2)$. It is preferred that an excess amount of the lithium compound be used in order to achieve a lithium-rich spinel $Li_xMn_2O_4$ with x greater than 1. As stated earlier, the reaction is advantageously conducted in air in a conventional oven without the need to evacuate the oven.

Positive electrode lithium manganese oxide active materials prepared according to the invention are usable in a typical cell configuration described with reference to FIG. 1. A description of the electrochemical cell or battery which uses the novel active material of the invention will now be described. By convention, an electrochemical cell comprises a first electrode, a counter-electrode which reacts electrochemically with the first electrode, and an electrolyte which is capable of transferring ions between the electrodes. A battery refers to one or more electrochemical cells. Referring to FIG. 1, an electrochemical cell or battery 10 has a negative electrode side 12, a positive electrode side 14, and an electrolyte/separator 16 therebetween. The negative electrode is the anode during discharge, and the positive electrode is the cathode during discharge. The negative electrode side includes current collector 18, typically of nickel, iron, stainless steel, and copper foil, and negative electrode active material 20. The positive electrode side includes current collector 22, typically of aluminum, nickel, and stainless steel, and such foils may have a protective conducting coating foil, and a positive electrode active material 24. The electrolyte/separator 16 is typically a solid electrolyte, or separator and liquid electrolyte. Solid electrolytes typically refer to polymeric matrixes which contain an ionic conductive medium. Liquid electrolytes typically comprise a solvent and an alkali metal salt which form an ionically conducting liquid. In this latter case, the separation between the anode and cathode is maintained, for example, by a relatively inert layer of material such as glass fiber. The electrolyte is not an essential feature of the invention. Essentially, any lithium ion containing conducting electrolyte may be used. Essentially any method may be used to maintain the positive and negative electrodes spaced apart and electrically insulated from one another in the cell. Accordingly, the essential features of the cell are the positive electrode, a negative electrode electrically insulated from the positive electrode, and an ionically conducting medium between the positive and negative electrodes. Examples of a suitable separator/electrolyte, solvents, and salts are described in U.S. Pat. No. 4,830,939 showing a solid matrix containing an ionically conducting liquid with an alkali metal salt where the liquid is an aprotic polar solvent; and U.S. Pat. Nos. 4,935,317; 4,990,413; 4,792,504; 5,037,712; 5,463,179; and 5,482,795. Each of the above patents is incorporated herein by reference in its entirety.

Positive Electrode

A positive electrode containing the lithium manganese oxide active material of the invention is prepared by the following method. For the positive electrode, the content was as follows: 50 percent to 90 percent by weight active material $(Li_xMn_2O_4)$; 5 percent to 30 percent carbon black as the electric conductive diluent; and 3 to 20 percent binder. The stated ranges are not critical. The amount of active material may range from 25 to 85 weight percent. The formation of each electrode will now be described. The positive electrode was prepared from mixtures of lithium-manganese oxide (active material) and EPDM (ethylene propylene diene monomer) as the binder, Shawinigan Black® was used as the carbon powder conductive diluent. The carbon powder conductive diluent is used to enhance electronic conductivity of the lithium-manganese oxide. Shawinigan Black®, available from Chevron Chemical Company, San Ramone, Calif., has a BET average surface area of about 70±5 square meters per gram. Other suitable carbon blacks are sold under the designation Super P™ and Super S™ available from MMM, a subsidiary of Sedema, which carbons have BET surface areas of about 65±5 square meters per gram. (MMM has its headquarters in Brussels, Belgium.) Examples of suitable polymeric binders include EPDM (ethylene propylene diene termonomers), PVDF (polyvinylidene difluoride), ethylene acrylic acid copolymer, EVA (ethylene vinyl acetate copolymer), copolymer mixtures, and the like. It is desirable to use either PVDF available from Polysciences Corporation with a molecular weight of 120,000 or EPDM available from Exxon Corporation and sold under the designation EPDM 2504™. EPDM is also available from The Aldrich Chemical Company. The description of carbon powders and binders constitute representative examples and the invention is not limited thereby. For example, other carbon powders are available from Exxon Chemicals, Inc., Chicago, Ill. under the trade name Ketjen Black EC 600 JD® and polyacrylic acid of average molecular weight 240,000 is commercially available from BF Goodrich, Cleveland, Ohio under the name Good-Rite K702™. The positive electrodes of the invention comprised mixtures of the lithium copper oxide active material, the binder (EPDM), and the carbon particles (Shawinigan Black®). These were mixed and blended together with a solvent. Xylene is a suitable solvent. The mixture was then coated onto an aluminum foil current collector to achieve a desired thickness for the final electrode.

Electrolyte

The electrolyte usable to form a completed cell may be a combination of EC/DMC when a carbon anode is used. That is, ethylene carbonate (EC) and dimethyl carbonate (DMC). The ratio of EC:DMC is about 2:1 by weight. Generally, when a lithium metal anode is used, the electrolyte is EC:PC (propylene carbonate) in 50:50 by weight ratio. In both cases, the salt usable with the solvent is 1 molar $LiPF_6$. Positive and negative electrodes are maintained in a separated condition using a fiber glass layer. Such separation can also be achieved using a layer of Celgard™. (Hoechst - Celanese Corp., Celgard 2400™, porous polypropylene, 25 microns thick.)

Negative Electrode

The electrochemical cell used with the positive electrode and electrolyte may contain one of a variety of negative electrode active materials. In one embodiment, the negative electrode may be metallic lithium. In more desirable embodiments, the negative electrode is an intercalation active material, such as, metal oxides and graphite. When a metal oxide active material is used, the components of the electrode are the metal oxide, electrically conductive carbon black, and binder in the proportions as described above for the positive electrode. Representative, but not limiting, examples include coke, graphite, $WO_3$, $Nb_2O_5$, and $V_6O_{13}$. It is thought that the lithium manganese oxide active material of the invention may also be used as the negative electrode as described in Koksbang, U.S. Pat. No. 5,418,090, which is incorporated herein by reference in its entirety.

The preferred negative electrode comprises about 80 to 95 percent by weight graphite particles, and more preferably about 90 percent by weight with the balance constituted by a binder. Preferably, the anode is prepared from a graphite slurry as follows. A polyvinylidene difluoride (PVDF) solution is prepared by mixing 300 grams of 120,000 MW PVDF (PolyScience) in 300 ml of dimethyl formamide. The mixture was stirred for 2 to 3 hours with a magnetic stirrer to dissolve all of the PVDF. The PVDF functions as a binder for the graphite in the anode. Next, a PVDF/graphite slurry is prepared by first adding 36 grams of graphite (SFG-15) into about 38.5 grams of the PVDF solution. The mixture is homogenized with a commercial homogenizer or blender. (For example, Tissue Homogenizer System from Cole-Parmer Instrument Co., Niles, Ill.). The viscosity of the slurry is adjusted to about 200 cp with additional PVDF solution. The slurry is coated onto a bare copper foil by standard solvent casting techniques, such as by a doctor blade type coating. (Alternatively, the slurry can be coated onto a copper foil having a polymeric adhesion promoter layer, described above.) In preparing the slurry, it is not necessary to grind or dry the graphite, nor is it necessary to add conductive carbon black to the graphite anode formulation. Finally, the electrodes are dried at approximately 150° C. for 10 hours to remove residual water prior to making the electrochemical cells.

Various methods for fabricating electrochemical cells and for forming electrode components are described herein. The invention is not, however, limited by any particular fabrication method as the novelty lies in the unique negative electrode material itself and combination of positive and negative electrode materials. Accordingly, additional methods for preparing electrochemical cells and batteries may be selected and are described in the art, for example, in U.S. Pat. Nos. 5,435,054 (Tonder & Shackle); 5,300,373 (Shackle); 5,262,253 (Golovin); 4,668,595; 4,830,939 (Lee & Shackle); 5,463,179 (Chaloner-Gill); and 5,482,795 (Chaloner-Gill). Each of the above patents is incorporated herein by reference in its entirety.

Cells containing the lithium manganese oxide active material of the invention demonstrate better capacity than those containing the conventional $Li_1Mn_2O_4$ spinel. For example, the $Li_{1.25}Mn_2O_4$ active material, on a weight basis, has an initial capacity of about 180 milliamp hours per gram. This initial capacity is very attractive and is in contrast to the capacity of conventional $Li_1Mn_2O_4$ which is at best about 140 milliamp hours per gram. However, in the conventional $Li_1Mn_2O_4$ not all the theoretical 140 milliamp hours per gram of capacity is available for reaction in the electrochemical cell. As described by those in the field, the best that one might hope for is reversible capacity on the order of 100 to 120 milliamp hours per gram. In practical electrochemical devices, only around 0.5 lithium is cycled reversibly. Obviously, in conventional $Li_1Mn_2O_4$ there is a tremendous difference between the theoretical capacity assuming all lithium is extracted, and the actual capacity observed during operation of a cell. In contrast, the positive electrode of the present invention contains excess capacity which will be evident on first cycle charging when an irreversible quantity of lithium ions is removed from the positive electrode active material, for example, $Li_{1.25}Mn_2O_4$, for delivery to the negative electrode, The initial capacity will be on the order of 180 milliamp hours per gram and will have a reversible capacity on the order of 150 milliamp hours per gram with the difference signifying the lithium irreversibly removed and constituting the excess capacity. Upon subsequent charge and discharge, the amount of lithium which will reversibly reintercalate into the positive electrode is thought to be about 1 atomic unit of lithium. Accordingly, with the excess lithium satisfying the irreversible capacity, it is possible to deliver a reversible capacity on the order of the theoretical capacity, namely, 150 milliamp hours per gram which is in stark contrast to the best hoped for reversible capacity on the order of 100 to 120 milliamp hours per gram observed with conventional $Li_1Mn_2O_4$. Accordingly, the present invention provides an economical and easy to use method for preparing an active material which solves the dilemma of the capacity problem observed when using conventional $Li_1Mn_2O_4$.

While this invention has been described in terms of certain embodiments thereof, it is not intended that it be limited to the above description, but rather only to the extent set forth in the following claims.

The embodiments of the invention in which an exclusive property or privilege is claimed are defined in the following claims:

1. A method for chemically preparing a compound of the nominal general formula $Li_xMn_2O_4$, with x greater than 1, which has excess lithium as compared to conventional chemically prepared $LiMn_2O_4$, said method comprising: forming a mixture of a manganese compound and a lithium compound each in particle form in a proportion which provides said nominal general formula, and an ammonium compound being in particle form and intermingled with said particles of said lithium and manganese compounds, and heating said mixture at a temperature ranging from 650° C. to about 750° C. to react said lithium compound with said manganese compound, in the presence of a reducing atmosphere comprising gaseous ammonia produced by decomposition of said ammonium compound, said decomposition being initiated before said reaction which produces a product of said nominal general formula in the presence of said ammonia gas which forms said reducing atmosphere; wherein said lithium, manganese and ammonium compounds are each independently selected from the group consisting of carbonates and acetates.

2. The method according to claim 1 wherein the value of x is greater than 1 and up to about 2.

* * * * *